(12) United States Patent
Tomlinson

(10) Patent No.: US 9,612,813 B2
(45) Date of Patent: Apr. 4, 2017

(54) METHOD OF AND APPARATUS FOR DISTRIBUTING SOFTWARE OBJECTS

(71) Applicant: DESLOCK LIMITED, Taunton (GB)

(72) Inventor: David Robin Tomlinson, Wellington (GB)

(73) Assignee: DESLOCK LIMITED, Taunton (GB)

( * ) Notice: Subject to any disclaimer, the term of this patent is extended or adjusted under 35 U.S.C. 154(b) by 0 days.

(21) Appl. No.: 14/827,616

(22) Filed: Aug. 17, 2015

(65) Prior Publication Data

US 2015/0378705 A1 Dec. 31, 2015

Related U.S. Application Data

(63) Continuation of application No. 13/297,547, filed on Nov. 16, 2011, now abandoned.

(30) Foreign Application Priority Data

Nov. 19, 2010 (GB) .................................. 1019618.6

(51) Int. Cl.
*H04L 29/06* (2006.01)
*G06F 9/445* (2006.01)
*G06F 21/10* (2013.01)

(52) U.S. Cl.
CPC ............... *G06F 8/60* (2013.01); *G06F 21/10* (2013.01); *H04L 63/0442* (2013.01); *H04L 63/061* (2013.01); *G06F 2221/0724* (2013.01)

(58) Field of Classification Search
CPC ......... G06F 21/10; G06F 8/60; H04L 63/061; H04L 63/0442
See application file for complete search history.

(56) References Cited

U.S. PATENT DOCUMENTS

| 5,438,508 A | 8/1995 | Wyman |
| 6,219,652 B1 | 4/2001 | Carter et al. |
| 7,383,230 B2 | 6/2008 | Wolff |
| 2004/0107163 A1 | 6/2004 | Dutta et al. |
| 2007/0177731 A1 | 8/2007 | Spies et al. |

FOREIGN PATENT DOCUMENTS

| GB | 2403105 A | 12/2004 |
| WO | WO 98/26548 | 6/1998 |
| WO | WO 00/70503 | 11/2000 |

OTHER PUBLICATIONS

United Kingdom Intellectual Property Office, Combined Search and Examination Report under Sections 17 and 18(3) dated Feb. 24, 2012, 6 pages.

*Primary Examiner* — Oleg Korsak
(74) *Attorney, Agent, or Firm* — Sunstein Kann Murphy & Timbers LLP

(57) ABSTRACT

A method of distributing software objects from a first entity to at least one second entity, the method comprising: using a distribution entity to accept a software object from the first entity, the software object including an identifier for a specific second entity, and wherein the at least one second entity is operable to contact the distribution entity and to enquire if a software object has been deposited for it, and if a software object has been deposited, to accept it from the distribution entity.

14 Claims, 14 Drawing Sheets

METHOD OF AND APPARATUS FOR DISTRIBUTING SOFTWARE OBJECTS

This application is a continuation of co-pending U.S. patent application Ser. No. 13/297,547, filed Nov. 16, 2011, which claims priority from Great Britain Patent Application GB 1019618.6, filed Nov. 19, 2010; both of which are incorporated herein by reference in their entireties.

FIELD OF THE INVENTION

The present invention relates to a method of and apparatus for delivering software objects.

BACKGROUND OF THE INVENTION

Within sensitive computing environments it is often necessary to control the access of individuals to sensitive documents or to computer systems. If strict role based hierarchies can be observed then such access may be defined by access control lists. However if organisations are more dynamic in their internal structure or individuals may be involved with privileged information for some projects but should not be involved at all for other projects then the use of encryption to control access to documents may be preferred. Encryption is particularly useful where documents may need to be shared with individuals who are outside a particular group within an organisation or do not belong to that organisation at all.

The use of encryption allows encrypted documents to be sent to a remote user and stored locally on their computing device. However from time to time it may be necessary to revoke an individual's rights to decrypt encrypted documents. Decryption keys may need to be revoked at the end of a project when people who had worked on it no longer need access to the documents, when a change of staffing occurs such as when an employee leaves an organisation, or when security is compromised in other ways for example by the theft of a computer from an authorised user.

The term "computing device" should be construed broadly, and covers not only conventional computers, but also devices where convergence with other consumer devices has taken place, such as telephones (smart phones), media players and other hardware. Furthermore, a user need not be a person but may be a device or a process (such as a software application). Thus computing devices may include controllers, vehicles having computing systems within them, and so on.

SUMMARY OF THE INVENTION

According to a first aspect of the present invention there is provided a method of distributing software objects from a first entity to at least one second entity, the method comprising:

using a distribution entity to accept a software object from the first entity, the software object including an identifier for a specific second entity, and wherein the at least one second entity is operable to contact the distribution entity and to enquire if a software object has been deposited for it, and if a software object has been deposited, to accept it from the distribution entity.

It is thus possible to provide a method of distributing software objects in which all communications between the first entity and the distribution entity are initiated by the first entity. Similarly all communications between the second entity and the distribution entity are initiated by the second entity. This is particularly important within a computing environment because the machines initiating communication have control over where the communication is going and hence the security risk in opening an outbound port is generally considered to be low. If, however, a machine is required to have an inbound port such that it can accept communication then this is often considered to be a high risk and in general IT managers or security consultants are very loath to open such inbound ports in their computing systems. In the present invention all "inbound" ports reside with the distribution entity which can be placed outside a secure computing environment because its functionality is very simple and the data it contains amounts to an identifier together with an encrypted software object. Advantageously the encryption is chosen to be quite strong such that if the distribution entity is compromised and its secrets are stolen by a malicious party then in real terms no information is divulged because it is all encrypted.

Preferably the identifier is a non-distinctive binary or alpha-numeric code such that if a third party managed to obtain copies of the identifier they would in general be none the wiser as to the actual identity of the or each second entity that the associated data object was destined for.

The or each second entity is a computing device. The or each computing device is associated with a computing device identity specific to that particular hardware platform irrespective of whoever is using the hardware platform. This is particularly relevant where, for example, a computer may be shared by two or more individuals, and each of which has a respective profile set on the machine such that the machine looks "personal" to them when they are logged in using their respective profile.

Advantageously each user of a machine is further associated with a user identity. Consequently a software object may be deliverable to a machine, irrespective of its user; to a user irrespective of the machine they are using, which may be the case where a user has access to several computers; or a to a specific user-machine combination.

The software object may comprise one or indeed several encryption/decryption keys which may be used to access specific items of information. The object may also include or be comprised of messages for the control of licences and permissions. The object might also comprise device settings, software updates or more generally any binary object, irrespective of its function, to which access is controlled such that only suitably authorised parties (human or machine) can access its contents. Advantageously the computer executes the security enforcement program such as "DESlock+" available from Data Encryption Systems Limited which can enforce full disk encryption, removable media encryption, email encryption, file or folder encryption, encrypted mountable volumes and secure file deletion.

Distribution of instructions or policies to suitably enabled security systems, such as the DESlock+ client may need to be provided on a periodic basis. The present invention provides a mechanism for disseminating instructions to one or more DESlock+ clients via a distributed and non-secure communications medium, such as the internet, by virtue of ensuring that a companies enterprise server managing the encryption keys and other specific items of information does not have to accept incoming messages on an open data port, and similarly a remote or client machine does not have to open an incoming port. In each case both the client and server initiate communication with the distribution entity, which can be regarded as being a proxy of the first entity, i.e. it acts as a proxy with respect to the companies enterprise server, thereby meaning that only one machine has to have open ports for inbound communication and that the information stored on that machine is encrypted such that if it becomes compromised by hacking or malicious software, the information contained therein is not exposed because it is encrypted and there is no natural route back to the private keys used by either the enterprise server or the client machines to decrypt the encrypted information.

A BRIEF DESCRIPTION OF THE SEVERAL VIEWS OF THE DRAWINGS

The present invention will now be described, by way of non-limiting example only, by reference to the accompanying Figures, in which:

FIG. 1 schematically illustrates a scenario in which an enterprise may wish to share confidential information with another enterprise and/or home-workers or other remote individuals;

FIG. 2 schematically illustrates the data flow paths between an enterprise server, one or more clients, and a distribution server constituting an embodiment of the present invention;

DESCRIPTION OF PREFERRED EMBODIMENTS OF THE INVENTION

Figure 1:
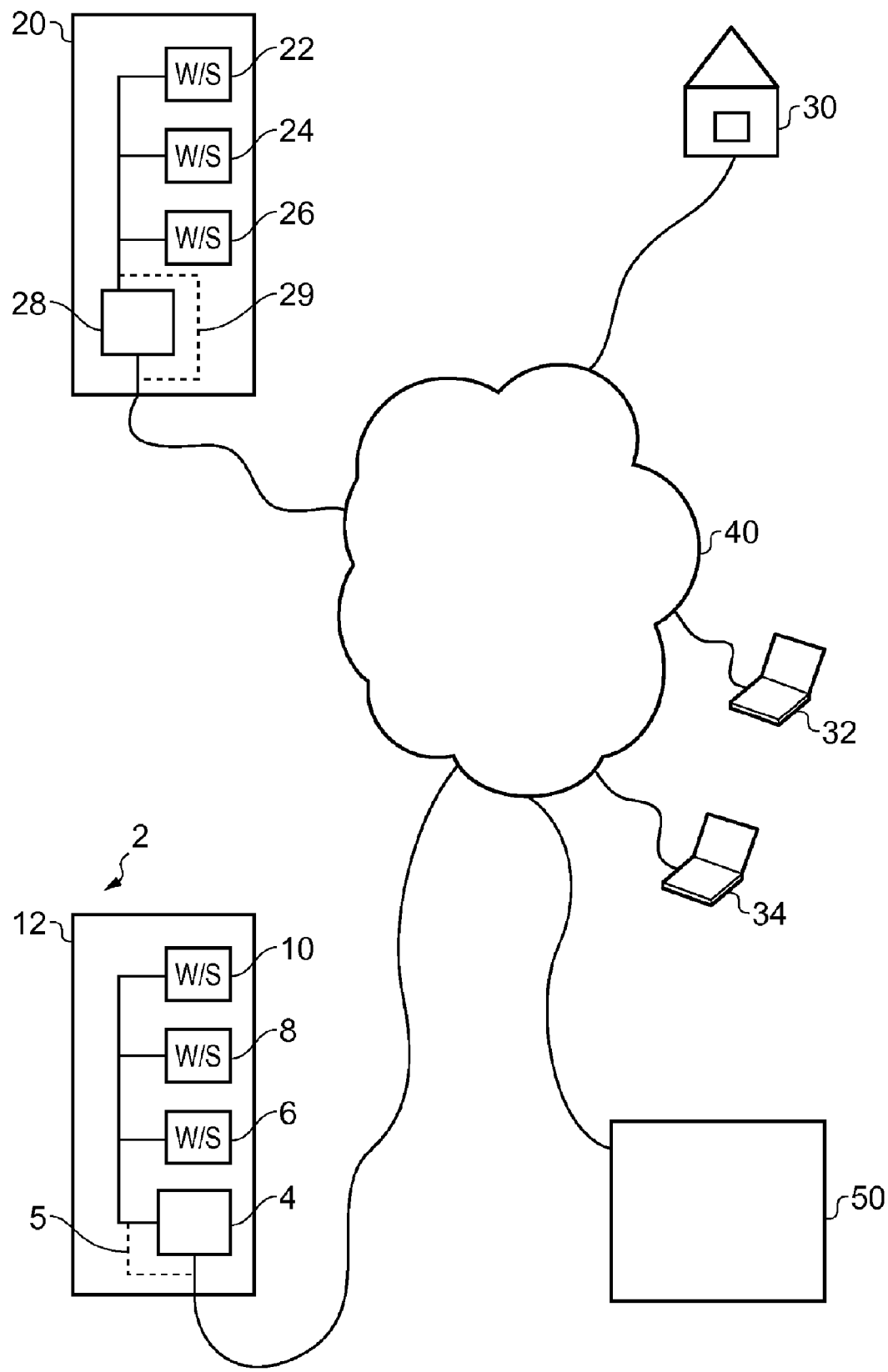

FIG. 1 shows an arrangement in which an enterprise, generally designated 2 comprises an enterprise server 4 and several workstations 6, 8, and 10 within a secure network delimited by the boundary 12. As shown, the workstations are secured behind the server 4, but this is not a requirement of the invention, and the workstations may use a communication path that bypasses the server, as shown by chain line 5.

Users using the workstations 6, 8 or 10 may wish to share files with other users such as users engaged within a second enterprise, generally designated 20 that use workstations 22, 24 and 26. The workstations may have their communications controlled via an enterprise server 28, as shown, or may have direct communications to the transmission medium (such as the internet), as designated by chain line 29. Files may also need to be exchanged with a home-worker, designated 30, or laptop users 32 and 34. The communication can occur via a non-specific and distributed communication channel, such as the internet 40.

The documents could, for example, be sent by email in an encrypted form. In order to decrypt the contents of the email an appropriate decryption key needs to be applied. However the keys themselves need to be distributed securely and key management requires that keys can be revoked or changed in the event of security breaches or changes in personnel.

As noted before, most security threats are deemed to occur when a computer or a server has an inbound port. However most IT managers are quite happy when the computer itself initiates the communication to a further device. The applicants realised that problems of key distribution could be managed by providing a distribution server, generally designated 50 in FIG. 1 which serves a proxy for the enterprise server 4 when it comes to key management.

Figure 2:
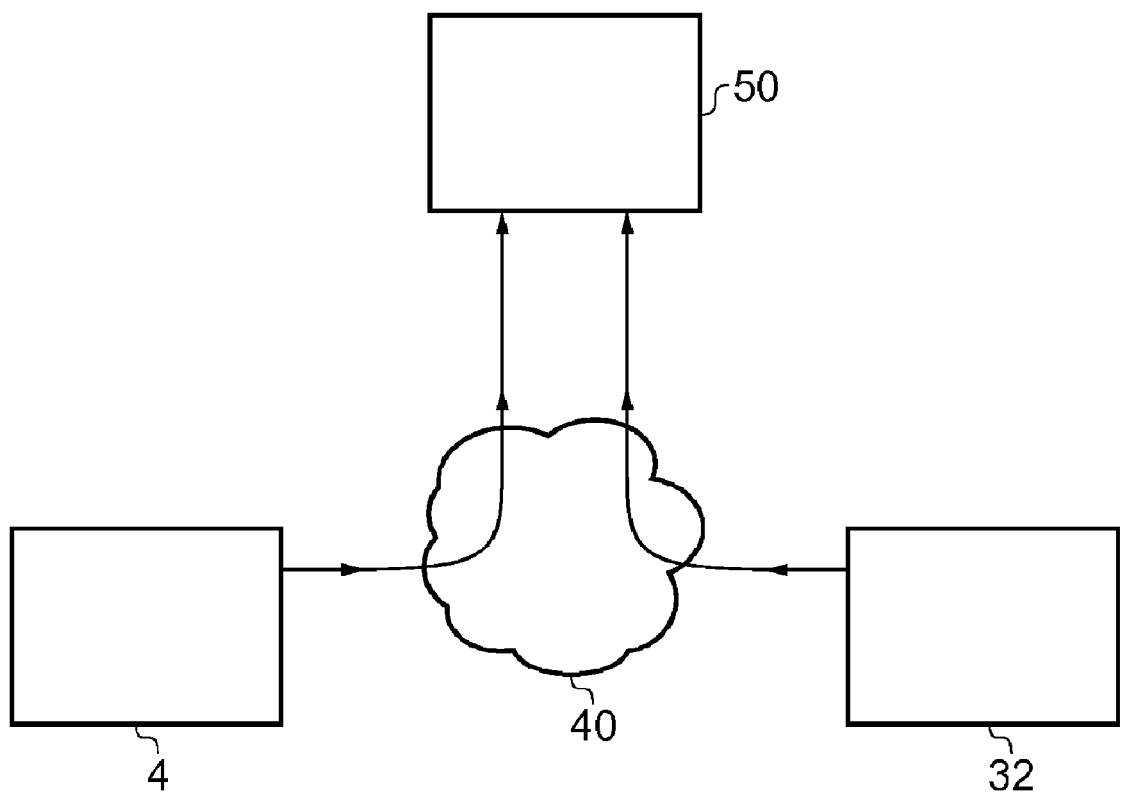

FIG. 2 shows schematically the communications between the enterprise server 4 and a further machine, such as the laptop 32 although it could apply to any of the other machines. The arrows indicate the direction of communication set up. Thus, enterprise server 4 contacts the enterprise proxy distribution server 50 via the internet 40. The server 4 initiates the communication on an outbound port and server 50 accepts the communication on an inbound port. Distribution server 50 does not initiate communication with the enterprise server 4. Similarly the computer 32 initiates communication with the distribution server 50 via the internet 40 using its outbound port. The distribution server 50 does not attempt to initiate communication with the computer 32. Thus in this distribution scheme the only machine that is required to accept inbound communications, or incoming calls if you like, is the machine 50. However once a call has been established information flow is then bidirectional along that communications route.

Figure 3:
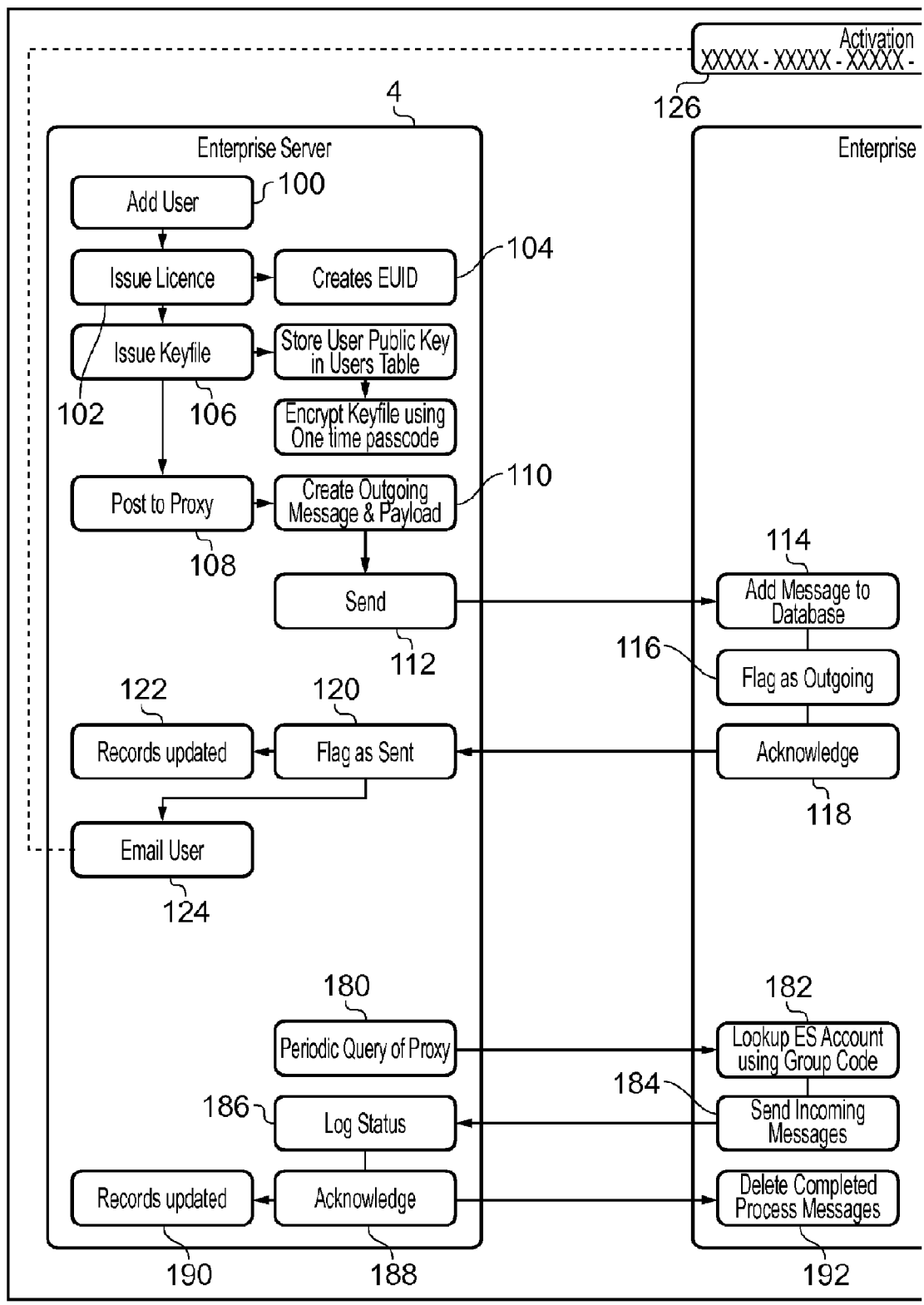
FIG. 3 is a flow chart illustrating enrolment of a new user.
Figure 3:
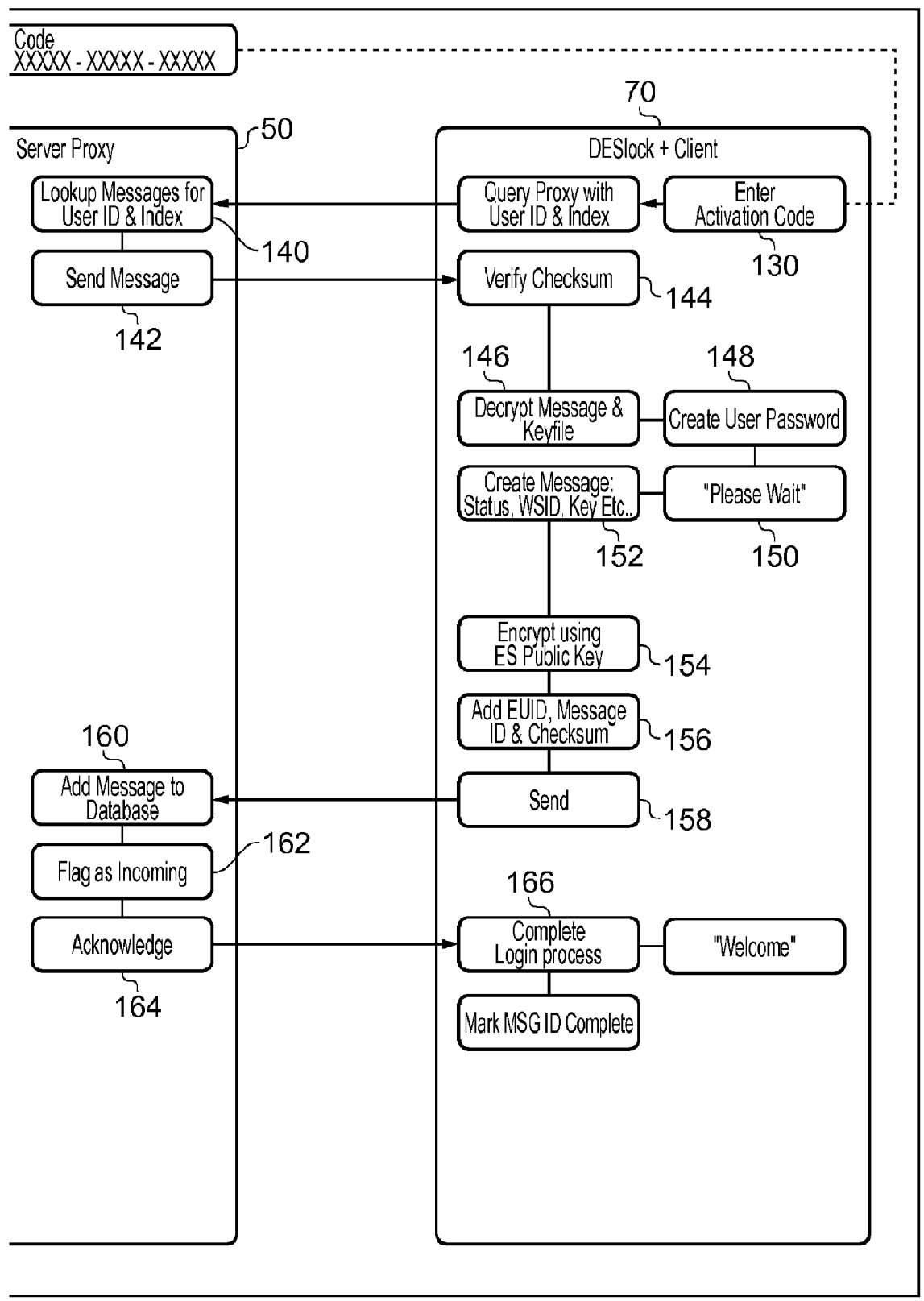

FIG. 3 schematically illustrates a process for registering a new user such that encryption keys can be securely exchanged with them and managed. For the purposes of the description it is assumed that the user machine, generally designated 70 is running security management software such as the DESlock+ client available from Data Encryption Systems Limited. A user machine 70 could be brought into a secure environment in order to have its software updated. However it is possible to enrol a remote user as will now be described. The process starts at step 100 where a decision is made to add a user. The process then continues to step 102 where a licence is issued in respect of the user and, as part of this a unique user identity 104 is created and assigned to the user. From then the process proceeds to step 106 where a key file is associated with the licence, the key file containing the user's public key in a user table, the key file having been encrypted with a one-time use pass-code.

Once step 106 has stored the public key and encrypted it using the one-time pass code control passes to step 108 where the file is posted to the enterprise proxy distribution server 50. This involves creating the outgoing message which will be described in greater detail with respect to FIG. 4, and sending the message at step 112 by opening an outbound communications port to the proxy 50.

Considering the proxy server, it receives the message at step 114 and adds it to a message database whilst also flagging it as an outgoing message at step 116. It then sends an acknowledgement back to the enterprise server at step 118. From here the enterprise server now has confirmation that the enrolment message has been sent and flags it as sent at step 120, it then proceeds to update its records at step 122 and send an email to the user 124 which email includes a user activation code 126.

Looking at the client side, the user receives his activation code at step 130 and enters it into his security client, for example the DESlock+ client software. The software now knows that a message is waiting for it and opens a communication channel to the enterprise proxy server 50 and provides the user identity and an index value to query the proxy server to look for a message for that user ID and having the same index. The user ID correctly identifies the user, whereas the index can be used to indicate how many times that message has been sent. The enterprise proxy server looks in its lookup table to find any messages having the correct user identity and index at step 140 and finding the message sends it back to the client machine 70 at step 142. Returning to the client, the client machine verifies a message checksum at step 144 in order to ensure that the message has not been tampered with and then proceeds to step 146 where it uses the one-time pass-code that it has been sent, i.e. the activation code, to decrypt the message and the key file. There control is passed to step 148 where the user is asked to enrol by creating a password and from there a "please wait" message is provided to the user at step 150 whilst program control passes to step 152 where the client software creates a new message including a workstation identity (which has been generated by the DESlock+ client), a workstation public key and so on. From here control passes to step 154 whereas the message including the workstation identity and key values are encrypted using the enterprise server's public key. Control then passes to step 156 where the message is given a message identity value, a checksum and possibly and end user identity "EUID" which is a further identifier. The message is then sent at step 158 to the enterprise proxy server. The proxy server 50 adds the incoming message to its message database at step 160, flags it as an incoming message at step 162 and acknowledges receipt of it at step 164. The client machine, upon receipt of the handshake confirming that the workstation identity and workstation key have been encrypted and posted to the enterprise proxy server 50 acknowledges that the logon is complete at step 166, displays a welcome message to the user and marks the message ID process as complete.

Every now and again the enterprise server 4 raises a periodic query of the proxy server 50 to see whether any messages are destined for it, as identified by step 180. The proxy server 50 uses the enterprise server account and a group code to see if any messages are waiting for it at step 182, and if there are it sends the messages to the enterprise server at step 184. The enterprise server 4 logs receipt of the message at step 186, acknowledges it at step 188, and updates its records at step 190. The acknowledgement issued at step 188 is used by the enterprise proxy server 50 to delete completed progress messages at step 192.

Figure 4:
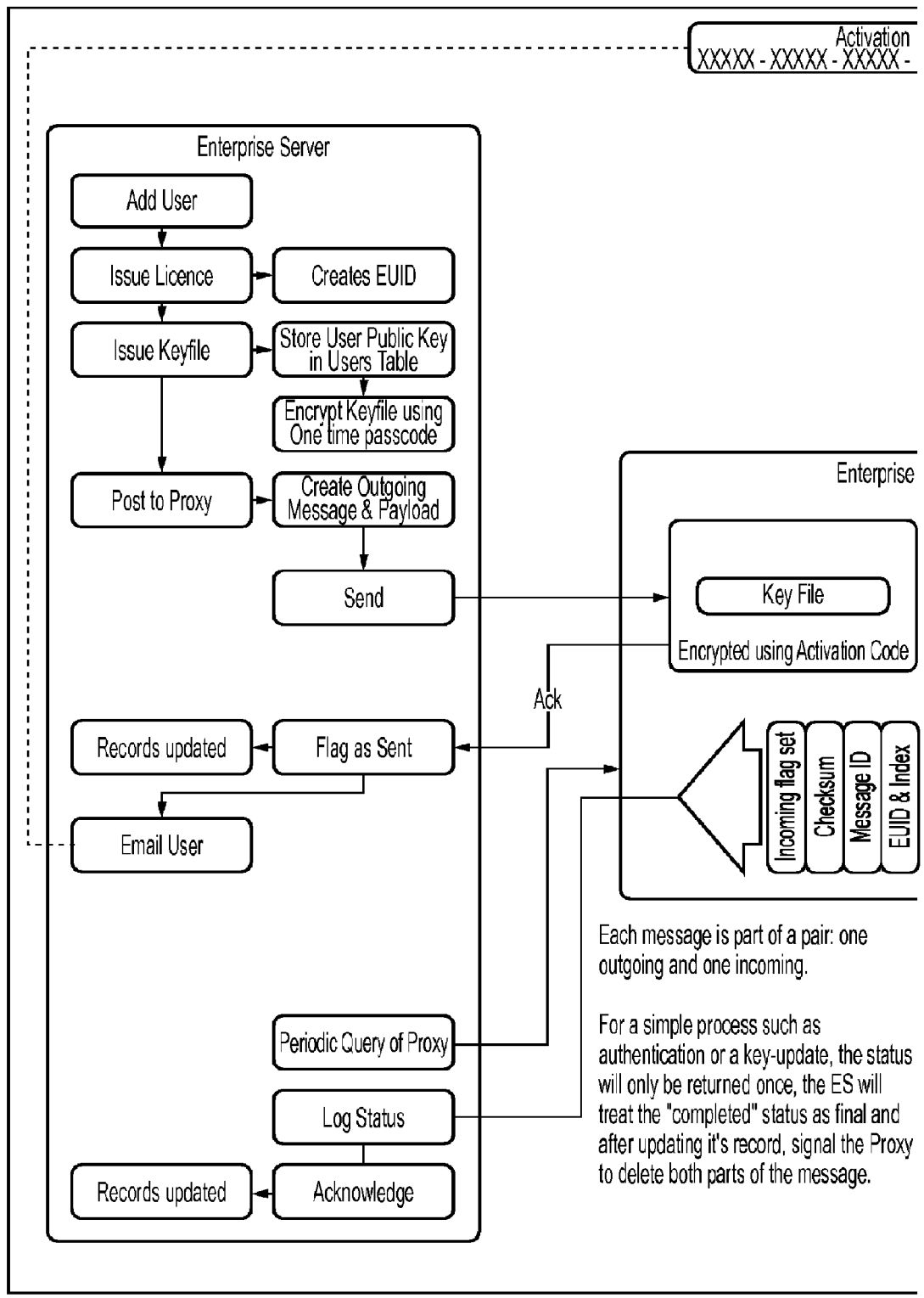
FIG. 4 shows the messages of FIG. 3 in greater detail.
Figure 4:
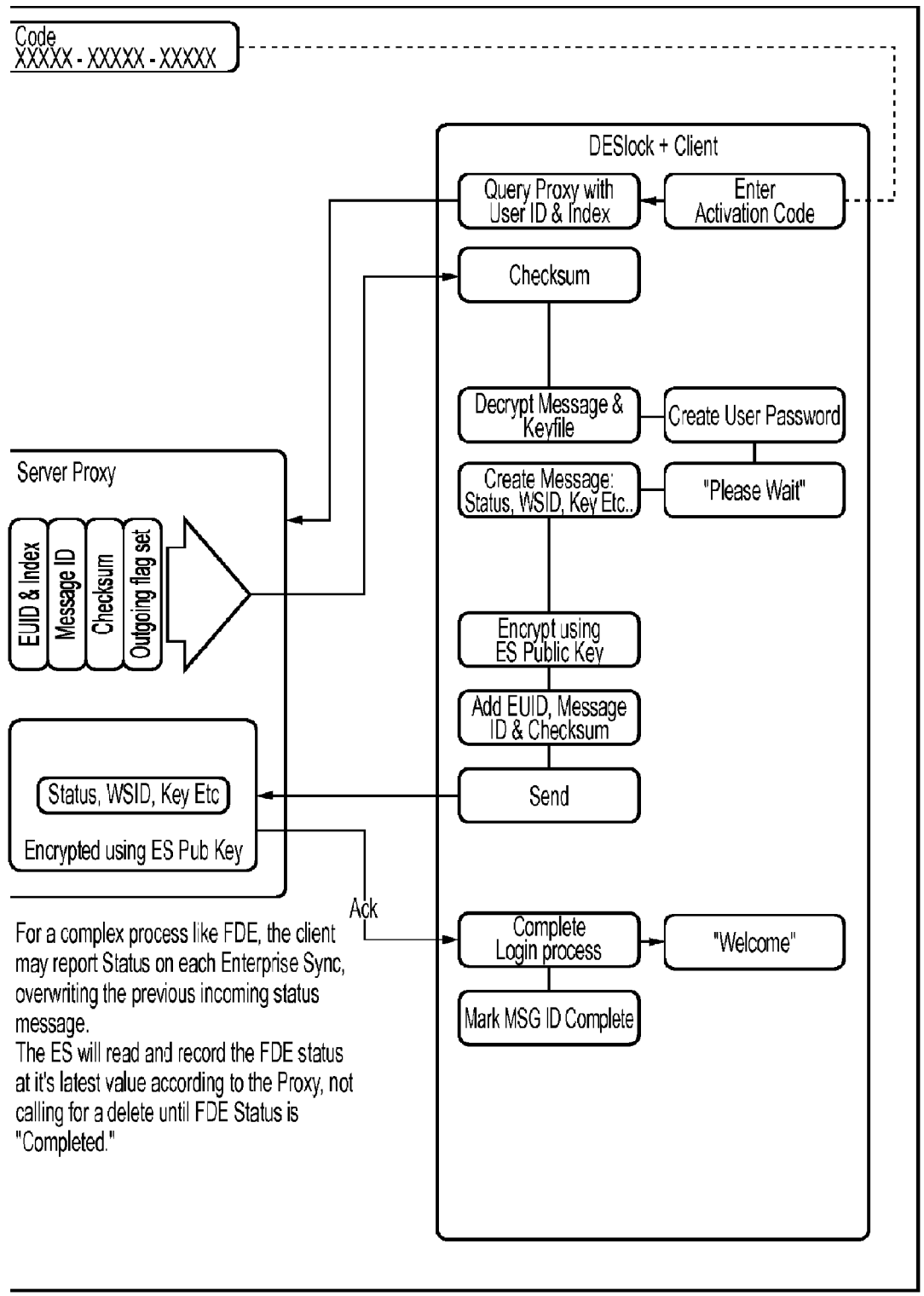

FIG. 4 repeats some of the details shown in FIG. 3 but instead of showing the process steps executed in the enterprise server proxy 50, it shows the message format. Thus, the message sent at step 112 includes a key file which has been encrypted using the user activation code, a user identity and an index, a message identity, a checksum, and a flag that is set to show that it is outgoing. This information is used by the client machine at step 144. Similarly, the message sent at step 158 contains a workstation identity, workstation key and workstation status which is encrypted using the enterprise server public key. It also contains an end user identity and index, a message identity, a checksum and a flag set to show that the message should be incoming for the enterprise server.

Figure 5:
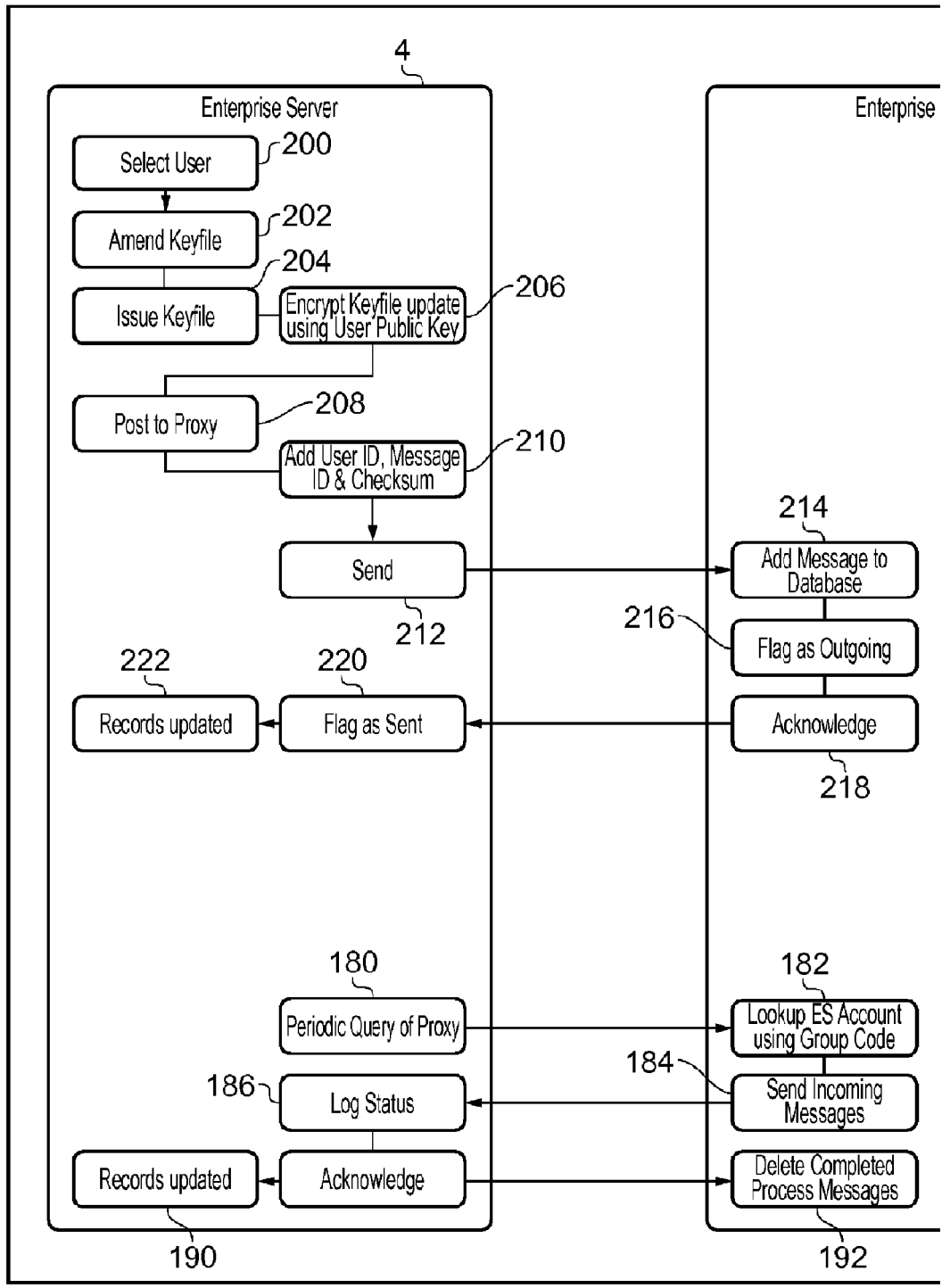
FIG. 5 illustrates how a message can be sent from an enterprise server to a client, and similarly a message can be returned from the client to the server.
Figure 5:
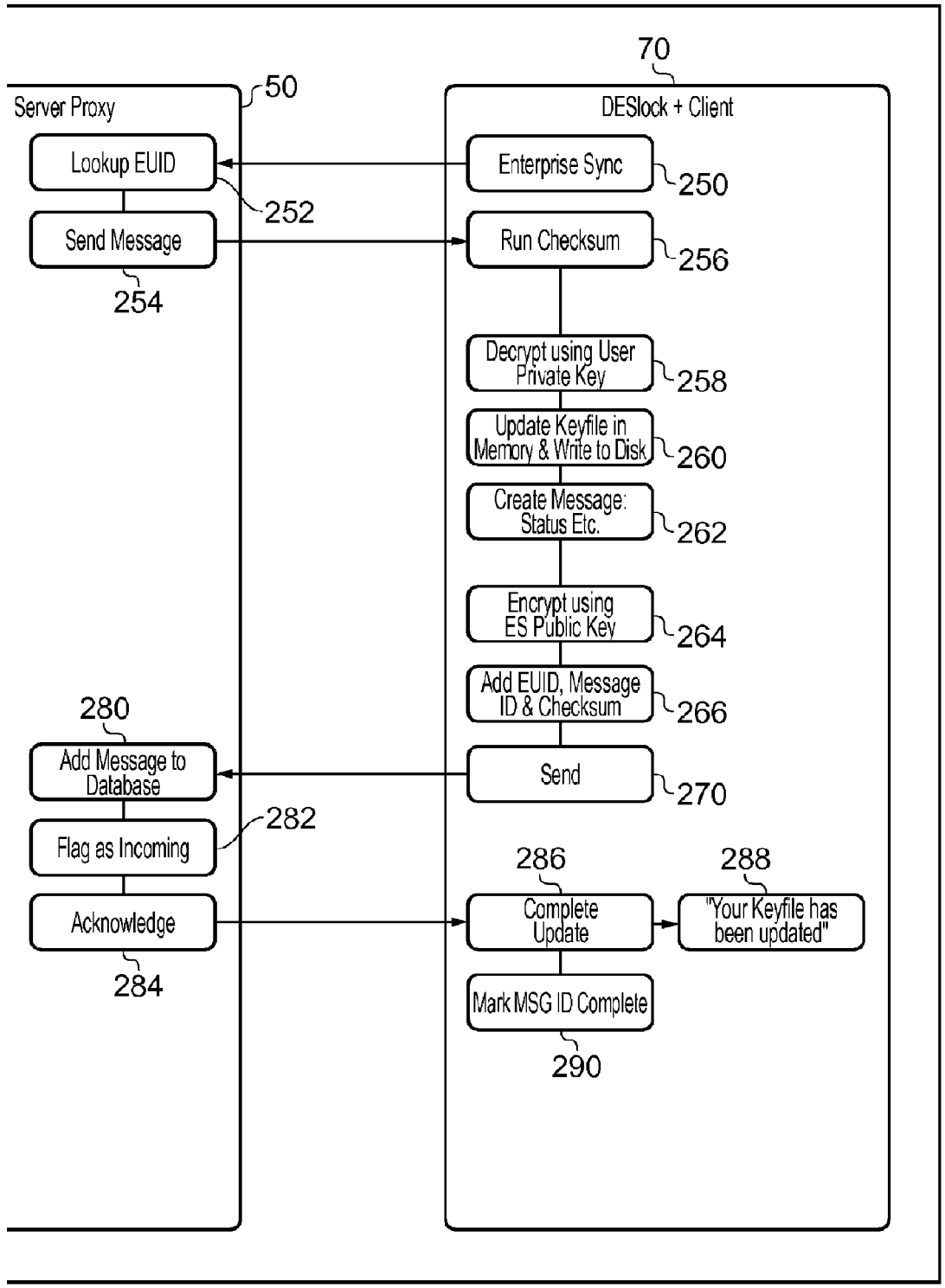

FIG. 5 schematically illustrates the process for modifying keys in the key file. The process starts at step 200 where a user is selected and a key amendment is made in step 202. A key amendment (which is an example of a software object) may include issuing a new key, or sending instructions to revoke authorities in respect of an already issued key. Once the amendments have been made, the key file is issued at step 204. From here control passes to step 206 where the amended key file is encrypted using the user's public key. Control is then passed to step 208 which initiates the process for posting the key file to the enterprise server proxy 50. The key file has a user identity added to it, a message identity and a checksum at step 210 and is then sent to the proxy at step 212. The proxy, upon receiving the message adds the message to its database at step 214, marks the message as outgoing, i.e. outgoing from the enterprise server at step 216 and acknowledges receipt of the message at step 218. The enterprise server 4 upon receipt of the acknowledgement marks the message as sent at step 220 and updates its records at step 222.

Meanwhile the user machine running the client software periodically tries to synchronise with the enterprise server in order to update its securities policies and other keys. This process is started at step 250.

Step 250 initiates a synchronise request with the enterprise server proxy 50 by sending the end user identity and asking the proxy whether it has any messages for it. The enterprise server proxy 50 uses the end user identity at step 252 to examine the message database to see if any messages are pending for that user, and if they are it sends the message at step 254. Returning to the client 70, the client checks the message checksum at step 256 in order to verify that the message is being received without corruption. Assuming that this check is passed, progress then proceeds to step 258 where the message is decrypted using the user's private key and then key file updates are written to the key file in the user's machine at step 260. Following completion of the updates the client 70 creates a status message to confirm what updates have been applied or what keys have been revoked at step 262. This message is then encrypted with the enterprise servers public key at step 264. From then the enterprise servers identity is added to the encrypted message, as is a message identity and a checksum at step 266. From here the sending process is initiated at step 270 which causes the client 70 to open a communications channel to the enterprise server proxy 50 to send the message such that the server can add it to its message database at step 280 mark it as "incoming" for the enterprise server 4 at step 282 and acknowledge receipt of the message at step 284. Returning to the client, once it has received acknowledgement of the message from step 284 it updates its records to show that the key file has been updated and marks the message as complete at steps 286, 288 and 290, respectively.

As before with respect to FIG. 3, the enterprise server at step 180 periodically queries the enterprise server proxy 50 to check if there are any messages awaiting for it. The proxy 50 looks up any messages for the enterprise server using an account group code, and if any are pending it sends the messages to the server as hereinbefore described with respect to steps 182, 184 and 186. Following receipt of the messages the enterprise server updates its records at step 190 and the enterprise server proxy deletes completed messages from the message table.

Figure 6:
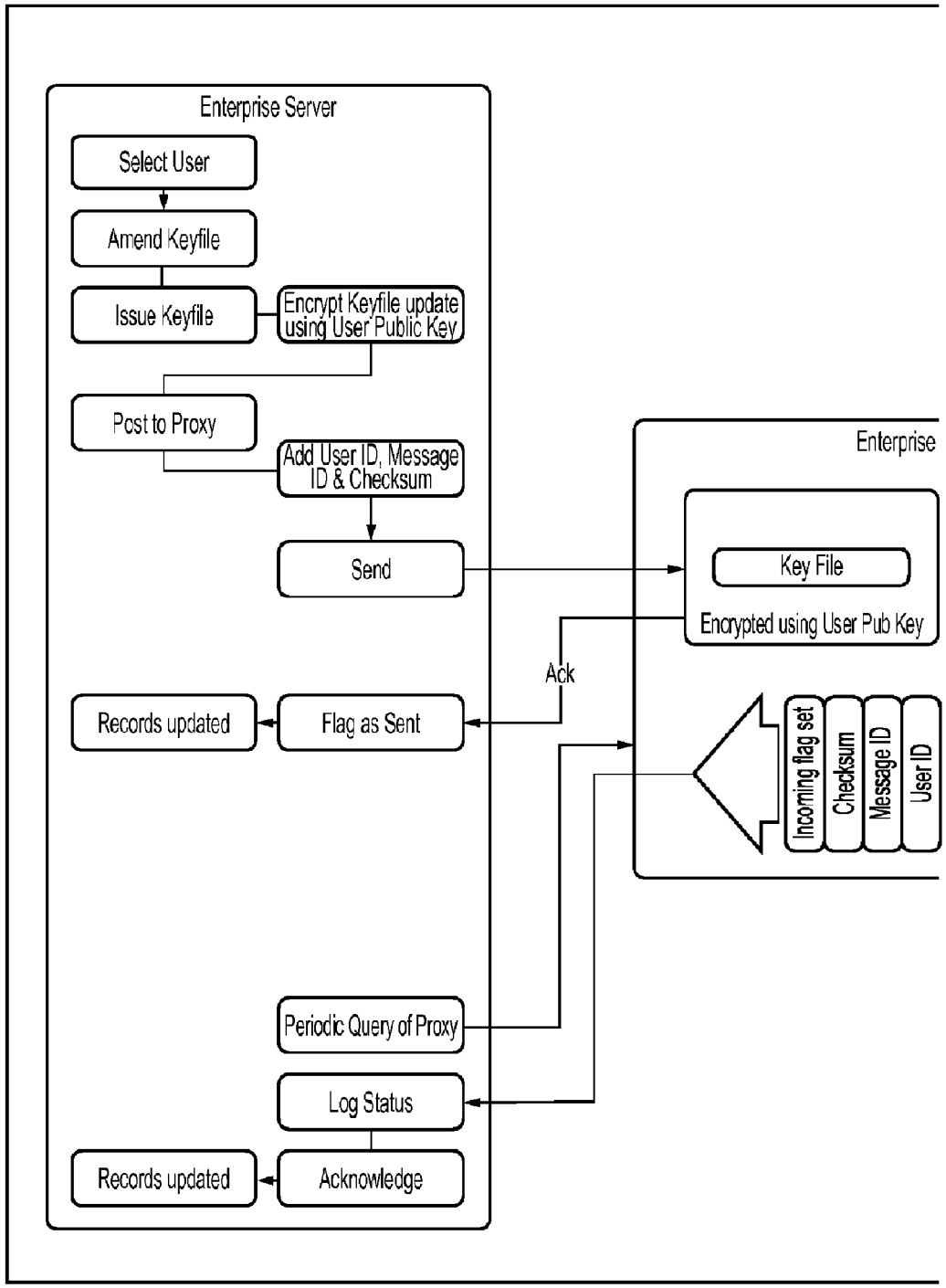
FIG. 6 shows the file configuration within the distribution server in greater detail.
Figure 6:
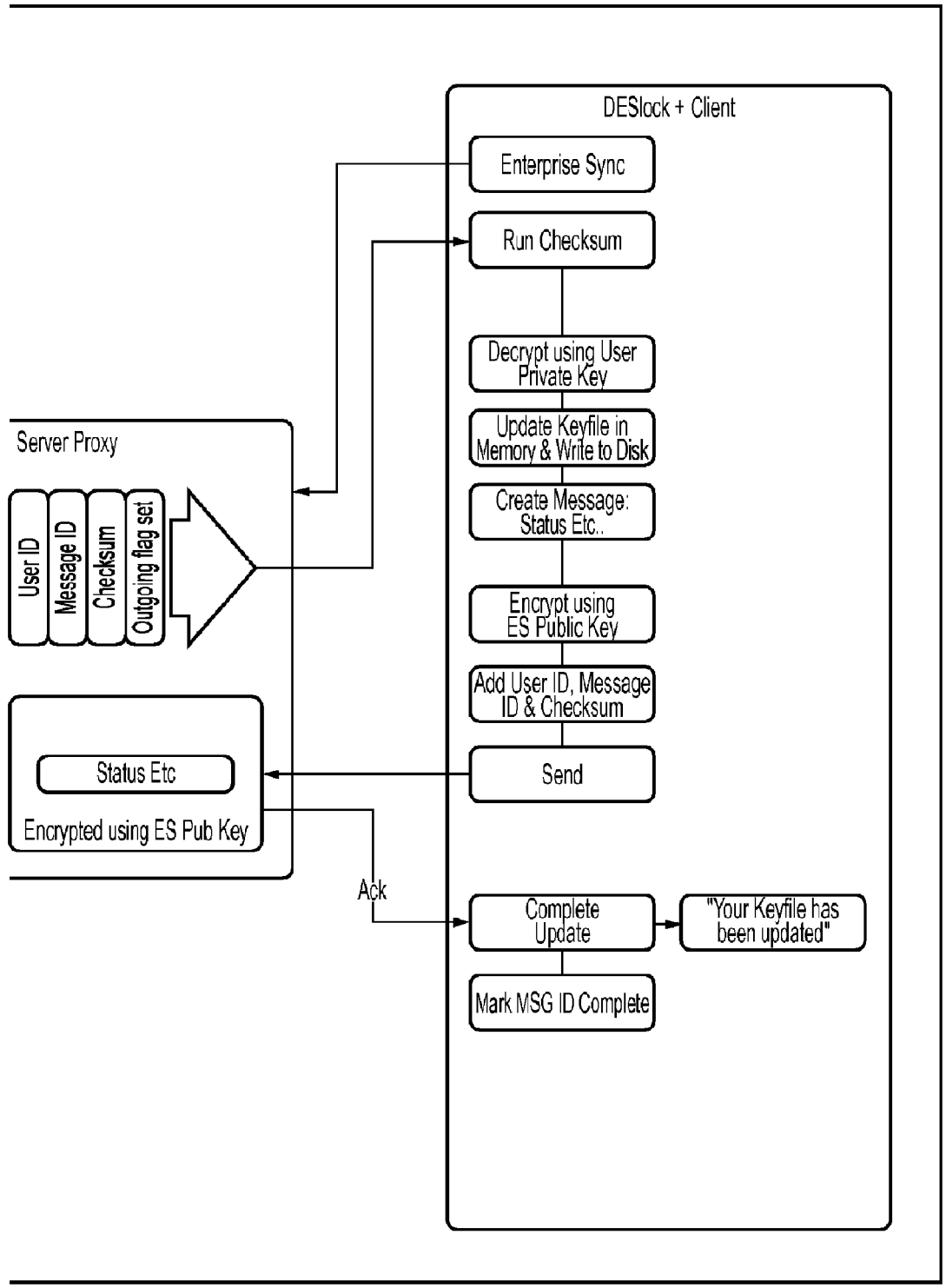

FIG. 6 repeats the process steps that were shown in FIG. 5, but now shows the message content in place of the method steps for the enterprise server proxy 50. Thus as before the message from the server comprises a key file which has been encrypted using the user's public key, as well as a user identity, a message identity, a checksum and a flag indicating that the message is outgoing from the enterprise server. Similarly messages sent by the client such as the status messages are encrypted using the enterprise server's public key, but also include a user ID corresponding to that of the enterprise server, a message ID, a checksum and a flag indicating that the message is incoming for the enterprise server.

Figure 7:
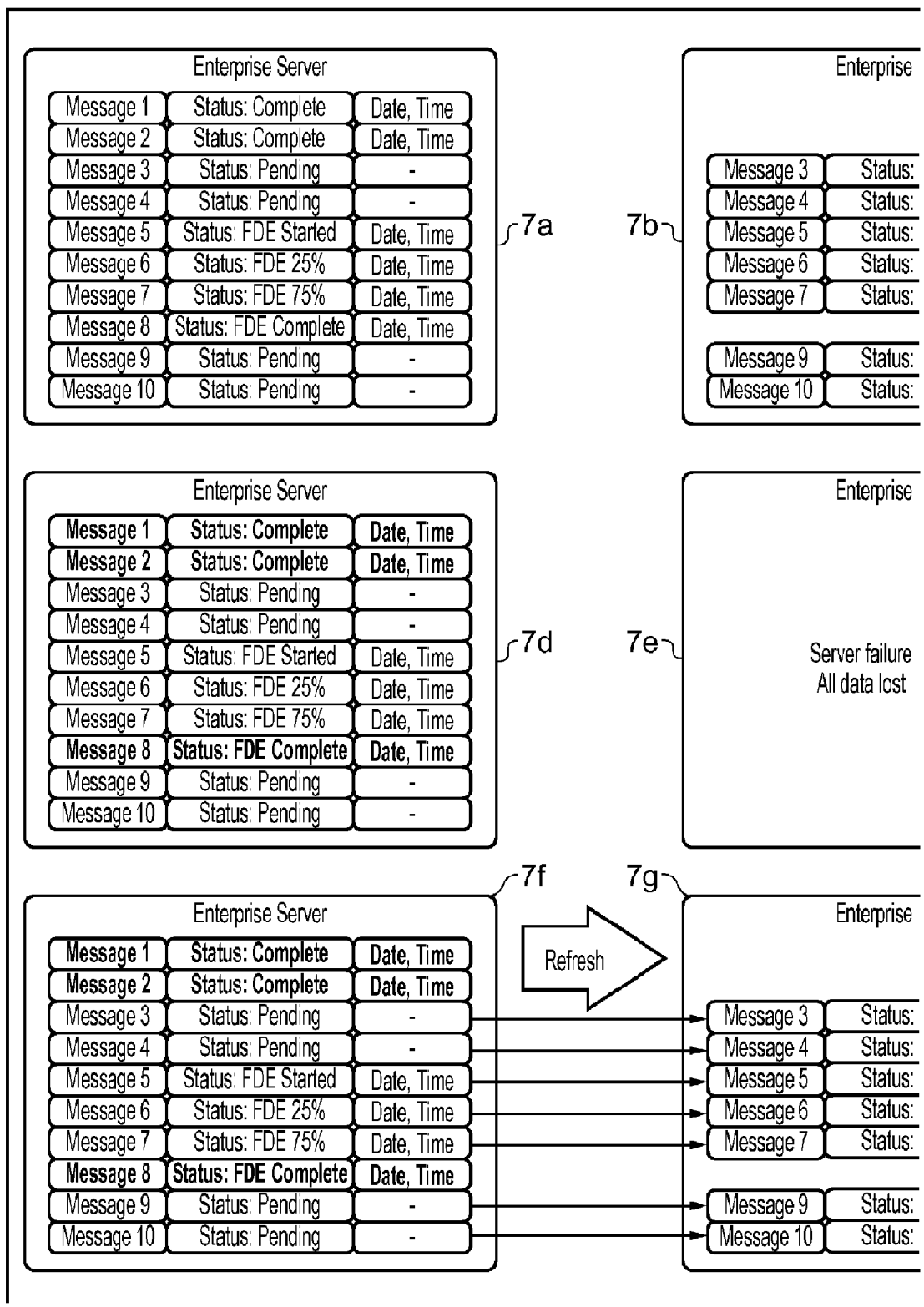
FIG. 7 illustrates how status updates are handled such that a graceful recovery can occur even from complete failure of the distribution server.
Figure 7:
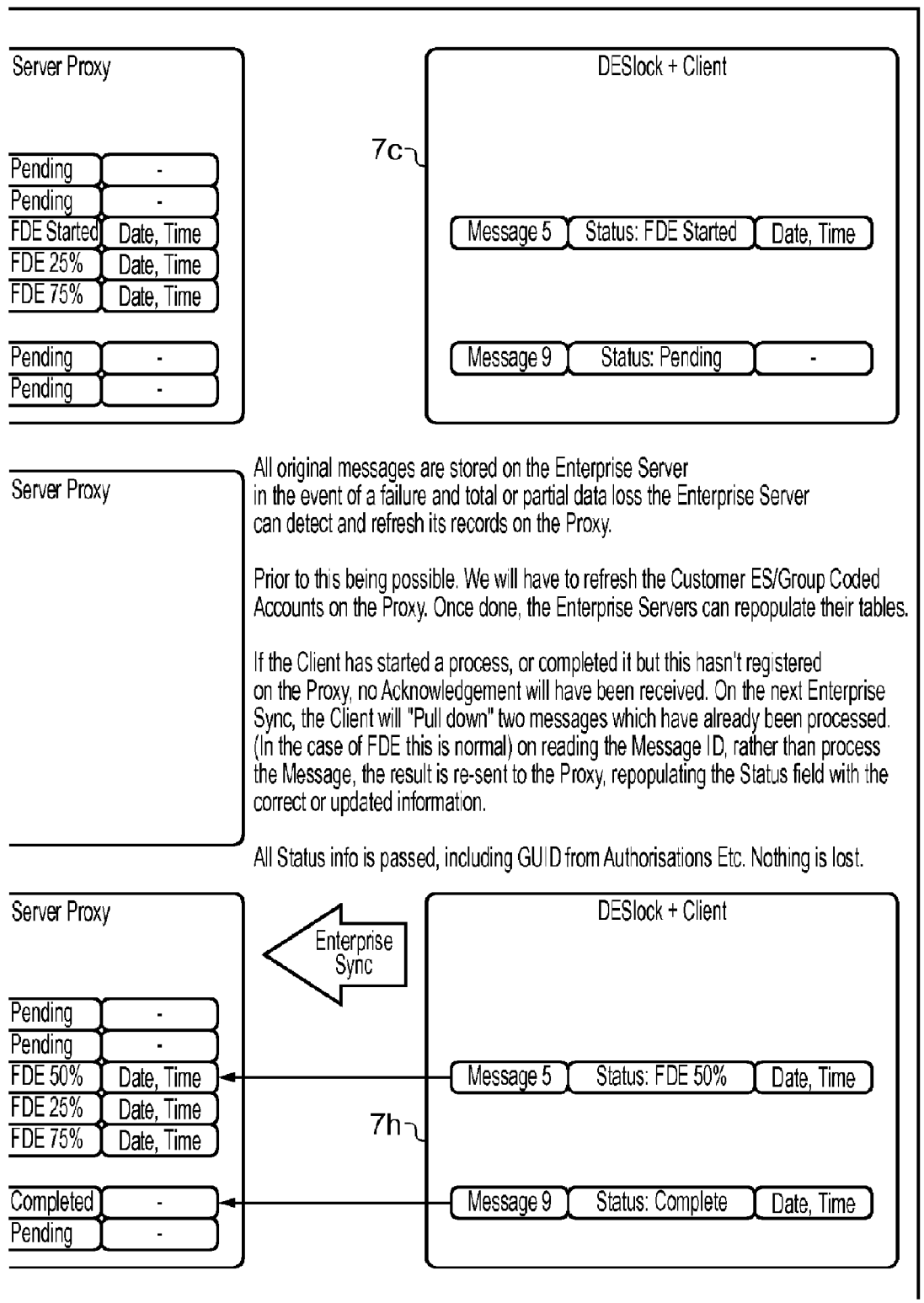

FIGS. 7a to 7h show data tables within the enterprise server, the enterprise server proxy and the client machine at the various stages. Starting with FIG. 7a the enterprise server maintains a message table, which in this case shows ten messages merely as a convenient example, which indicate whether a message has been sent and the message status, i.e. whether the instructions sent on that message have been completed as indicated by "complete", whether the message has been sent but no action has been taken as a result of it, as indicated by "pending" and other status messages, such as message 5 which has requested that full disc encryption be set "on" the client machine, where the response indicates that a full disc encryption has been started. This compares to message 6 or message 7 which indicates that a full disc encryption process is 25% complete or 75% complete as appropriate. Each message where something has been done, either completed, started or a progress update has been performed has a date and time stamp. As shown in FIG. 7b, the enterprise server proxy maintains a cut down message table in that messages which are complete have been deleted. Thus only pending or in progress messages are shown in the server proxy table FIG. 7b.

FIG. 7c shows a message table within the client where only messages 5 and 9 were intended for the client machine. Message 5 and message 9 both relate to tasks which have either been started or not yet started.

Suppose now that the enterprise server proxy suffers a catastrophic failure which results in all its data being wiped.

The enterprise server 4 can query the enterprise server proxy to check its health, and can be informed from the proxy 50 that its data table has been wiped. At this point no information is in reality lost because the enterprise server 4 includes its own data table as shown in FIG. 7c which it can inspect to identify all processes which it expects to be pending. From then the enterprise server can, as shown in FIG. 7f, resend all pending or incomplete messages, instruction updates and key updates back to the enterprise proxy server 50 such that it rebuilds its data table at FIG. 7g. Here the client machine can then synchronise with the enterprise server proxy, and post its own table updates at FIG. 7h. Thus the data is recovered and no updates are lost.

As noted hereinbefore, a workstation may be used by several individuals and it may therefore be desirable to apply workstation specific key changes which are not related to any particular individual. This is possible because, during the enrolment procedure, the workstation had a unique identity associated with it which is independent of the end user identity.

Figure 8:
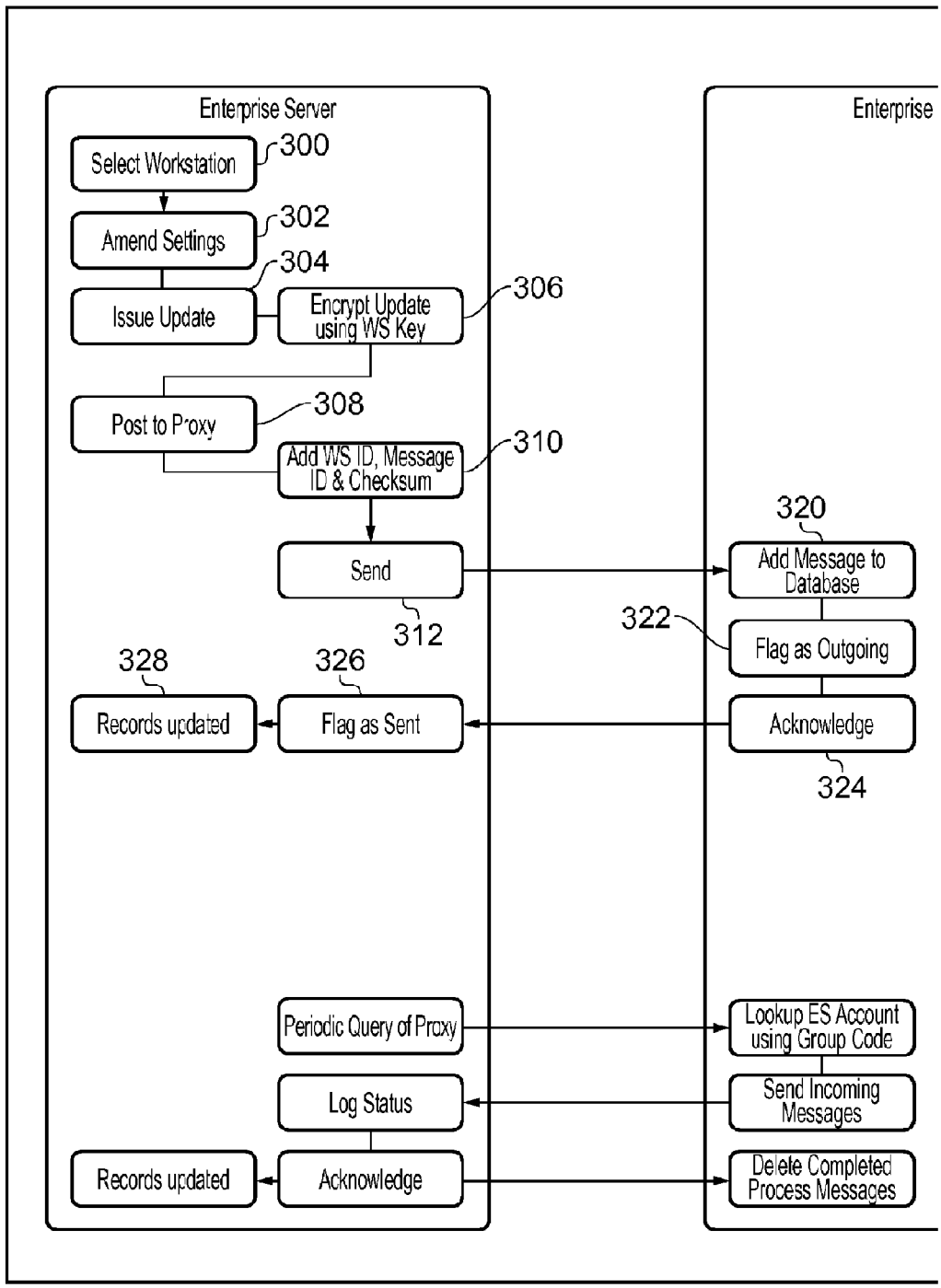
FIG. 8 illustrates how workstation settings can be updated.
Figure 8:
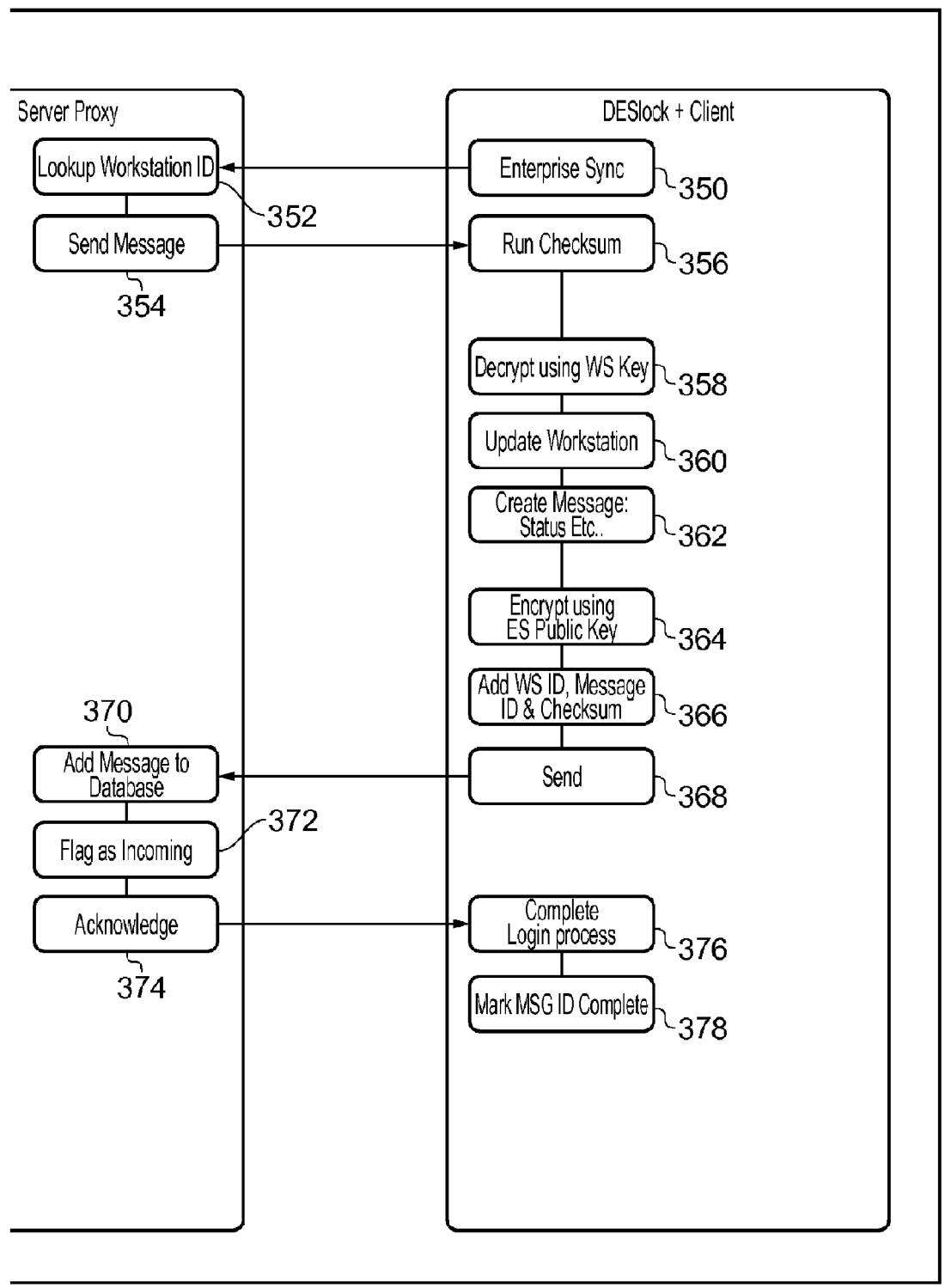

Thus, as shown in FIG. 8, if it is desired to amend workstation settings a process is started in which, at step 300, the workstation is selected and the workstation settings which it is desired to push to the workstation are amended at step 302. From here the workstation update is issued at step 304 and is encrypted using the workstation public key at step 306 prior to being posted to the proxy at step 308. The process of posting the message to the proxy includes adding the workstation identity, a message ID and a checksum at step 310 and then opening the communication channel to the proxy at step 312 in order to send the message.

As described with respect to earlier messages, the enterprise server proxy 50 adds the message to its database at step 320, flags it as outgoing at step 322 and acknowledges the message at step 324. Following receipt of the acknowledgement the enterprise server flags the message as sent at step 326 and updates its records at step 328.

Looking at the user workstation, it initiates a synchronisation process at step 350. During this process the workstation sends the workstation ID and asks were there any messages pending for it. The enterprise server proxy uses the workstation ID to query its message table to see if any messages are pending at step 352. If a message is pending then it sends the message at step 354. As noted before, the message had a checksum appended to it, so that client can check the checksum at step 356 to make sure that the message is correctly formed. Control then moves to step 358 where the message is decrypted using the workstation private key and the instructions contained therein are enacted by the security client in order to update the workstation settings at step 360. Following update of the settings a status message is created at step 362, encrypted with the enterprise server public key at step 364, has its workstation ID appended to it, a message ID, an enterprise server identity added at step 366 and sent at step 368. From here the message is added to the enterprise server proxy message database at step 370 and flagged as "incoming" for the enterprise server at step 372 prior to being acknowledged at step 374. Upon receipt of the acknowledgement of the client machine completes the user login process at step 376 and marks the message as completed in its own data table at step 378.

Finally, as described hereinbefore with respect to FIG. 3 the enterprise server runs a periodic query of the enterprise server proxy to see if any messages have been acted upon and status updates received.

It is thus possible to provide a method for distributing security instructions, and encryption keys without needing to open inbound communication ports on either an enterprise server or a client machine.

Although the invention has been described with respect to distributing decryption keys, it can also be applied to other software objects of high value, such as licences which may be for limited use, limited number of times or limited duration. This technique can be used to distribute any software object of which licences, documents, decryption keys, executables, patches, and applications represent a non-exhaustive list of examples.

The invention claimed is:

1. A method of distributing encryption or decryption keys, licenses, instructions or permissions as software objects from a first networked computing entity to at least one second networked computing entity the method causing at least one hardware-implemented computer processor to execute instructions recorded on a non-transitory computer readable storage medium to perform the method comprising:
using a distribution entity on a different network to that of the first networked computing entity and the second networked computing entity to accept a software object from the first entity such that all communication between the first entity and the distribution entity is initiated by the first entity, the software object including an identifier for a specific second entity, where the identifier is non-distinctive to a third party, and wherein the at least one second entity is operable to contact the distribution entity and to enquire if a software object has been deposited for it, and if a software object has been deposited, to accept it from the distribution entity, such that all communication between the second entity and the distribution entity is initiated by the second entity.

2. A method as claimed in claim 1, in which the software object is encrypted, or has an encrypted portion.

3. A method as claimed in claim 2, in which the software object was encrypted using the public key of a public key-private key pair associated with the specific second entity.

4. A method as claimed in claim 1, in which the first entity does not have an open port for receiving communications sessions initiated by the distribution entity.

5. A method as claimed in claim 1, in which the distribution entity performs a handshake with the first and at least one second entity, and keeps a log of transactions, such that the first and second entities can examine if previous communications have been received.

6. A method as claimed in claim 5, in which the first entity can inspect or receive data from the log of transactions.

7. A method as claimed in claim 1, in which the second entity does not have an open port for receiving communication sessions initiated by the distribution entity.

8. A method as claimed in claim 1, in which the first entity keeps a record of all objects that are to be received or acted on by the at least one second computing entity, and can resend them to the distribution entity if the distribution entity loses data.

9. A method as claimed in claim 1, in which a second entity runs a client which controls contact between the second entity and distribution entity and enforces licenses, permissions or instructions received via the distribution entity.

10. A method as claimed in claim 1, in which each of the at least one second entity is a computing device or data processor with a machine identity.

11. A method as claimed in claim 10, in which each user of a specific one of the second entities is associated with a user identity.

12. A method as claimed in claim 10, in which the software objects are destined for a specific user and computing device combination, or for a specific computing device independent of its user.

13. A method as claimed in claim 1, in which each message includes a checksum.

14. A method as claimed in claim 1, in which each message includes a direction flag.

* * * * *